Jan. 18, 1966  H. K. CYMARA  3,230,017
SILO

Filed June 18, 1964  3 Sheets-Sheet 1

INVENTOR.
HERMANN K. CYMARA.
BY
ATTORNEY

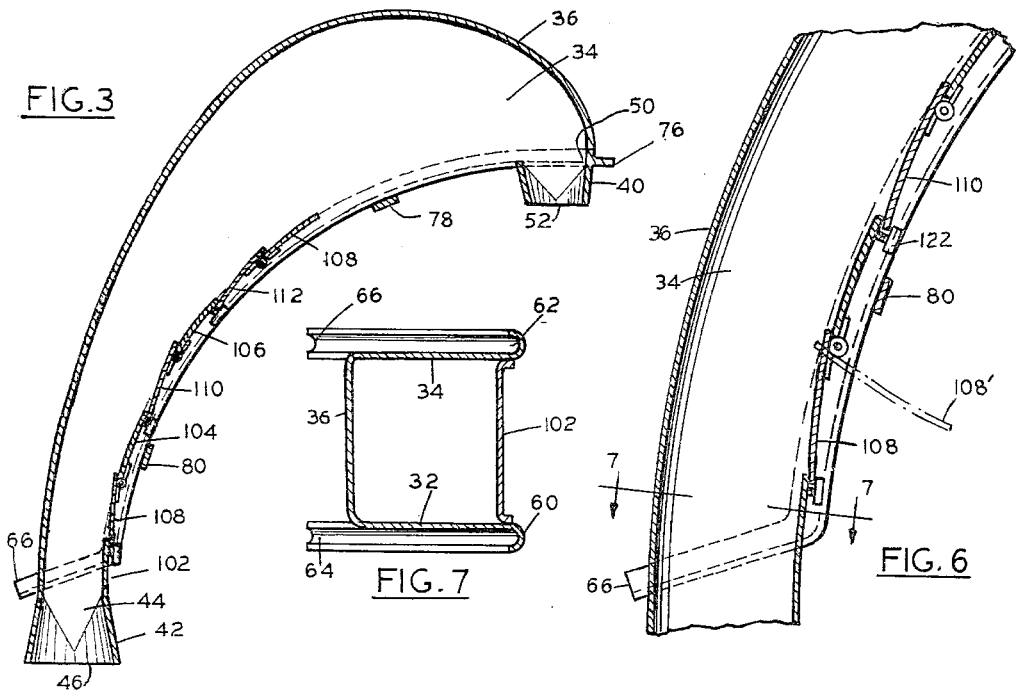
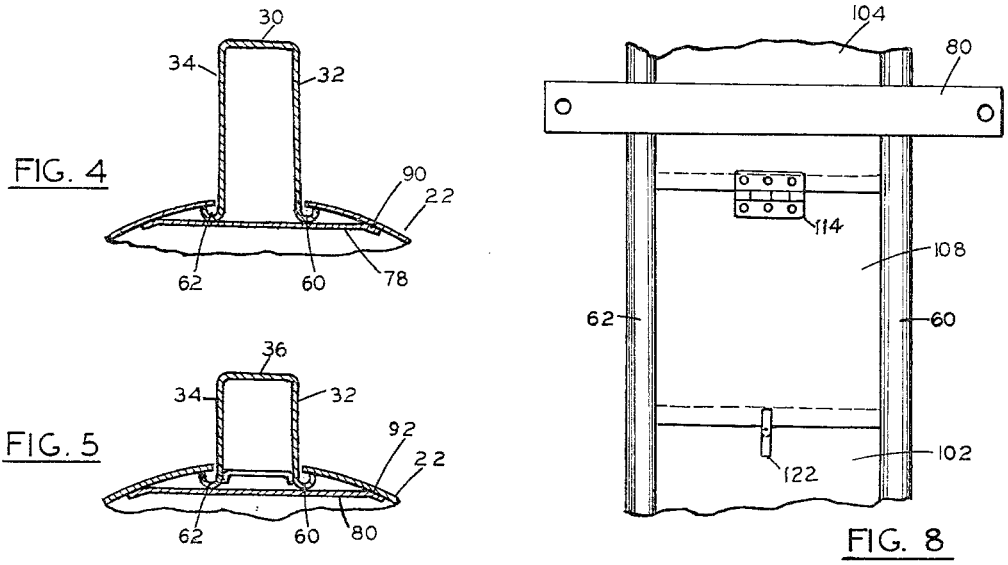

INVENTOR.
HERMANN K. CYMARA.
BY
ATTORNEY

United States Patent Office 3,230,017
Patented Jan. 18, 1966

1

3,230,017
SILO
Hermann K. Cymara, R.D. 2, Newfield, N.Y.
Filed June 18, 1964, Ser. No. 376,135
5 Claims. (Cl. 302—60)

This invention relates to silos and more particularly to apparatus for delivering silage to a silo, and the even distribution thereof within the silo.

In a co-pending application, Serial No. 322,121 filed November 7, 1963, now Patent No. 3,158,408, granted November 24, 1964, there is shown a power driven silo distributor adapted to be supported centrally within a silo, for distribution of silage evenly, in filling the silo. By even distribution, a maximum quantity of silage can be stored in a given silo. It will be further understood, that to utilize the maximum capacity of a silo it is desirable to fill the same to the maximum level permissible. The filling of such silos has in the past been effected from elbow tubes projected into the silo beneath the roof, and discharging therefrom in the center of the silo, such elbow tubes being supplied with silage elevated by a blower disposed at the silo base, the blower discharging into an elevating or blower tube, which connects to the silo elbow tube.

The present invention is directed to the provision of an elbow duct or arcuate channel structure for receiving the silage from the blower tube and delivering the same to the center of the silo, the elbow duct being located substantially wholly above and outside of the silo dome whereby filling to the maximum degree is rendered possible. Further the invention has to do with the provision of an arcuate channel structure that is readily installed in a 90-degree roof slot in the silo dome, with the channel structure disposed above the silo dome.

The invention further has to do with the distribution within the silo of silage discharged from such elbow duct, and provision for distribution from different levels from within the silo, one of which is located within the roof dome. A further feature of the invention is the provision of an elbow duct that is closed at its lower end with doors for inspection and clean out. The invention further has to do with the use of a distribution tube as a ladder within the silo, whereby the distributor is readily attached directly to the elbow duct discharge nozzle.

The above and other novel features of the invention will appear more fully hereinafter from the following detailed description when taken in conjunction with the accompanying drawings. It is expressly understood that the drawings are employed for purposes of illustration only and are not desired as a definition of the limits of the invention, reference being had for this purpose to the appended claims.

In the drawings, wherein like reference characters indicate like parts:

FIGURE 3 is a sectional view through the elbow duct taken on the line 3—3 of FIGURE 1;

FIGURE 4 is a sectional view taken on the line 4—4 of FIGURE 2;

FIGURE 5 is a sectional view taken on the line 5—5 of FIGURE 2;

FIGURE 6 is an enlarged sectional view of a lower portion of the duct of FIGURE 3;

FIGURE 7 is a sectional view taken on the line 7—7 of FIGURE 6;

FIGURE 8 is a further enlarged fragmentary view of a lower portion of the duct, as viewed from the inside;

2

Figure 2:
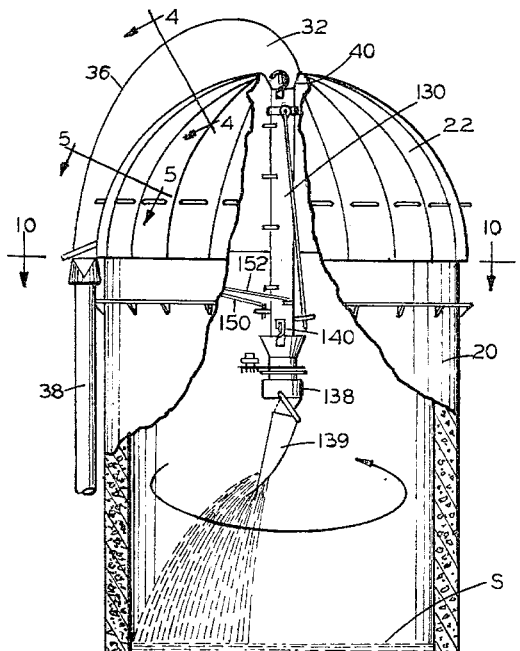
FIGURE 2 is a side elevational view of the upper end of a silo with parts broken away.
Figures 13, 14:
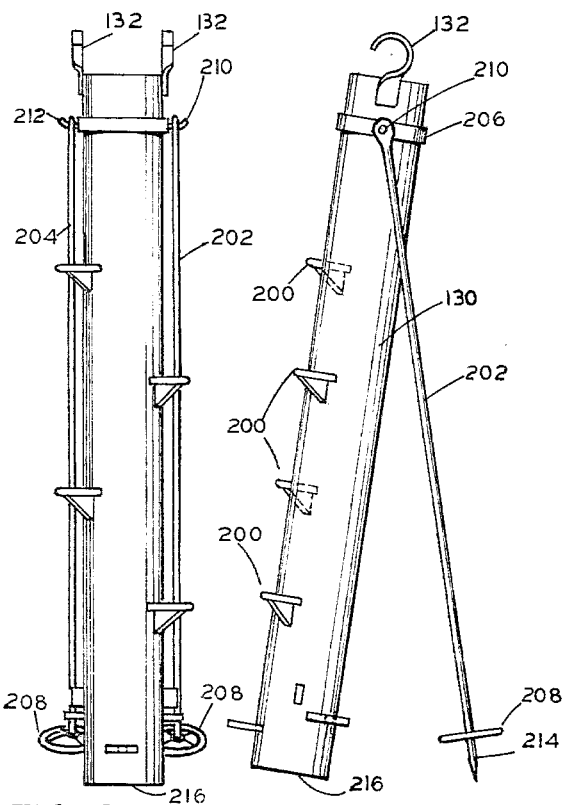
Figure 12:
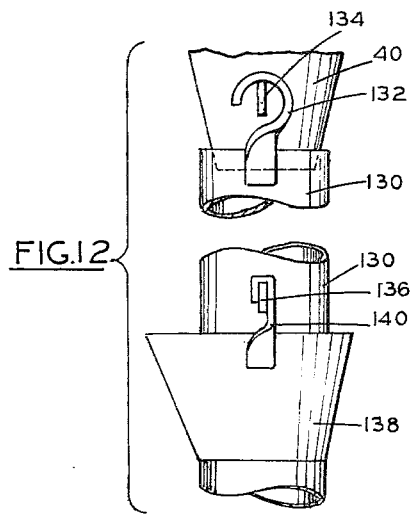
Figure 10:
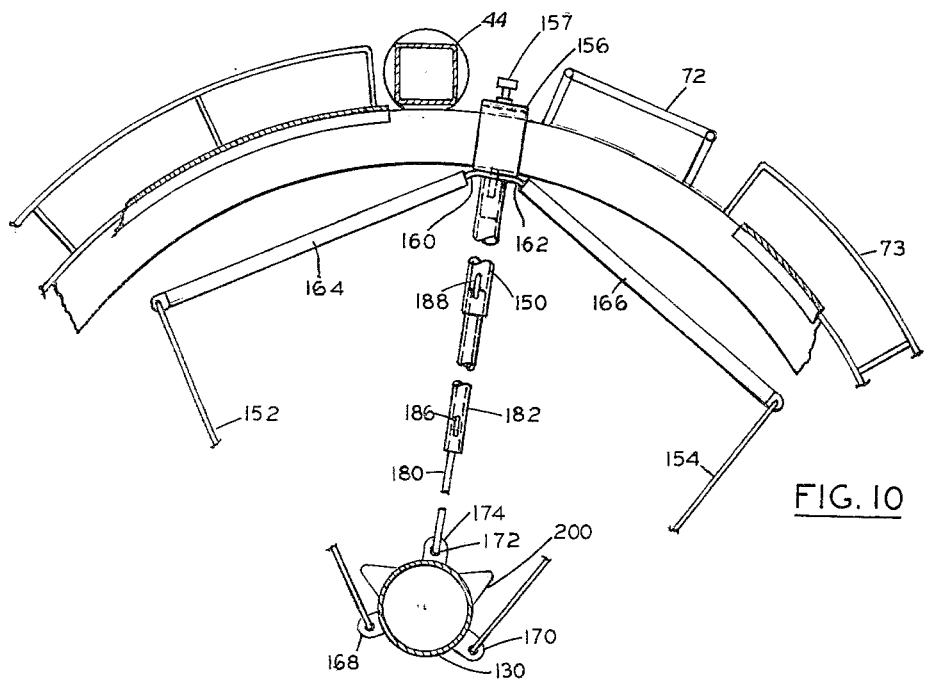
Figure 11:
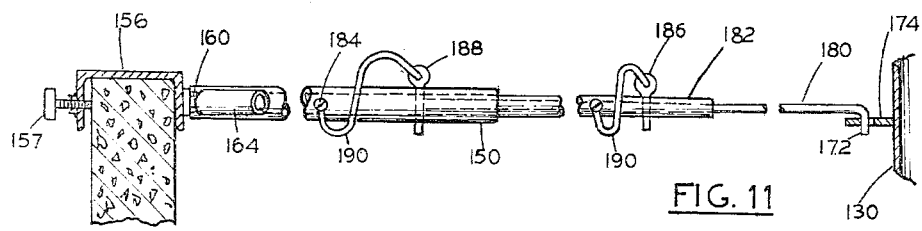
Figure 9:
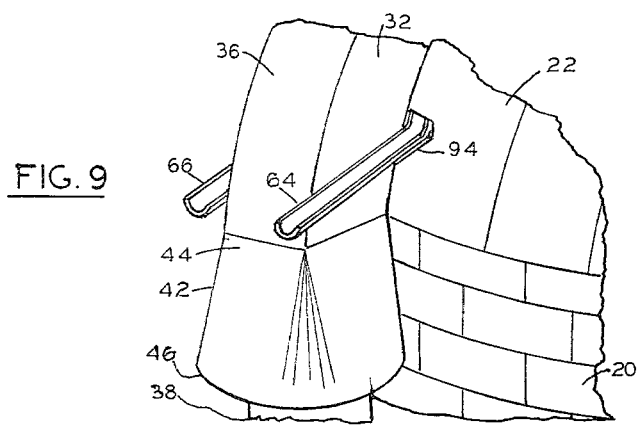

FIGURE 9 is a fragmentary perspective view showing the lower ends of the troughs;

FIGURE 10 is a fragmentary sectional view through the silo, taken on the line 10—10 of FIGURE 2;

FIGURE 11 is a sectional view taken on the line 11—11 of FIGURE 10, showing the distribution tube holding duct in side elevation;

FIGURE 12 is an enlarged fragmentary side elevational view of the hanger for the tube and distributor of FIGURE 2;

FIGURE 13 is a front elevational view of the tube and its fittings so as to serve as a ladder; and FIGURE 14 is a side elevational view of the tube in its aspect of serving as a ladder.

Figure 1:
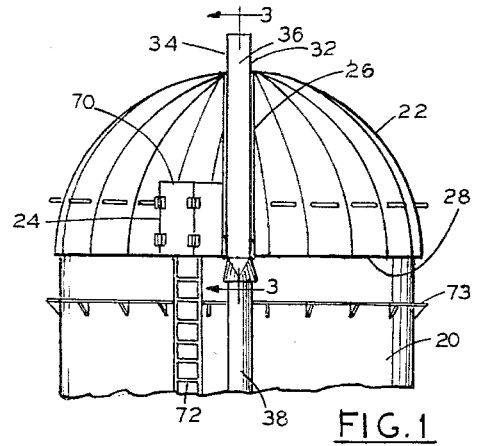
FIGURE 1 is a front elevational view of the upper end of a silo with the elbow duct installed.

Referring to FIGURE 1, there is shown the upper end of a silo 20, having the usual dome roof 22, which in practice, may be of sheet metal construction, while the silo is of masonry, concrete or the like. One side of the dome roof, and adjacent the doorway 24, there is provided a slot 26 of uniform width extending from the lower edge 28 of the dome, to a point somewhat beyond the top center. In practice the slot may be about 10 inches wide, and extend 5 inches past top center.

Fitted within such slot is a curved "U" sectioned channel 30, or elbow duct, having spaced planar side walls 32 and 34, and a curved outer wall 36, the latter being so contoured as to promote the flow of airborne grain or silage, blown upwardly into the channel from the blower tube 38, for discharge at the upper end thereof, into the discharge nozzle 40. Such channel, at its lower end is provided with a sleeve 42. Such sleeve is square at its upper end 44 where it joins the channel, and flares to a circular form at its lower end 46, whereby to readily telescopically receive the upper end of the blower tube 38. At the other end of the channel, there is provided the discharge nozzle 40, such nozzle being of a square configuration at its upper end 50, and of a width corresponding to that of the channel 30. The nozzle is of circular configuration at its lower end 52.

The inside curved edges of the channel 30 are provided with outwardly facing troughs 60 and 62 extending from along side the upper opposite square sides of the discharge nozzle 40, to a point near the lower end of channel, where each connects with inclined trough 64 and 66 extending downwardly and outwardly away from the silo to a point well beyond the outer wall 36 of the channel. In practice the spacing between the side walls 32 and 34 will be slightly less than the width of the slot 26, to facilitate installation of the channel 30 in the slot 26 from the inside, and the troughs on either side thereof will carry rain or melted snow such as may enter through the space between the channel sides 32 and 34 and the edges of the slot 26.

In practice, adjacent one side of the slot 26 is an access door 70 which may be about three feet square, and the silo may have the usual ladder 72 leading thereto, and catwalk 73 leading around the silo. The upper end of the channel is preferably provided with a flange 76 for attachment to the silo roof, and the inside of the channel is provided with two or more rigid strap supports 78 and 80 welded or otherwise secured to the underside of the troughs 60 and 62, such straps being long enough on either side for attachment to the underside or inside of of the dome roof 22.

It will be seen that the doorway 24 may be a lateral extension of the slot 26, or may be spaced somewhat from slot 26. In either case the elbow duct is adapted to be prepared as a unit and installed in the dome slot from beneath, the duct channel being inserted into the silo through the doorway, and then lifted into position, with its flange 76 resting on the silo dome at the end of the slot 26. Thereafter the straps 78 and 80 are attached to the inside of the silo roof by any suitable means as at 90, and 92 respectively. The inclined channels 64 and 66 extend out from the roof, through notches 94 in the sides of the slot 26.

The inside open side of the channel may be closed off at its lower end to provide a tube effect for the flow of airborne silage, discharged from the duct 38, and for this purpose, there are provided a number of transverse plates such as 100, 102, 104 and 106, the lower most one of which may be an extension of the upper square portion 44 of the sleeve 42 while the others are separately secured to the side walls 32 and 34 of the channel 30. Between plates 100 and 102, 102 and 104, and 104 and 106, are doors 108, 110, and 112 each of which is hinged as at 114 to one of the respective plates 102, 104 and 106. Each door has an upper portion 116 which overlaps on the inside the lower edge 118 of the plate to which it is hinged, and a lower portion 120, which overlaps on the outside the plate below the plate to which it is hinged. Each of the plates is provided with a turn button 122 adapted to hold the lower edges of the doors 108, 110 and 112 to the adjacent plate in closed position. By turning the buttons 122, each of the doors may be opened, in the manner indicated in FIGURE 6 by the dotted outline 108'. Each of the channel doors 108, 110 and 112 are readily accessible from the silo doorway 24, and are readily opened for inspection, and clean out as often as desired.

The sleeve 40 is adapted to discharge into a tube 130 that is provided with hooks 132 on opposite sides, which are in turn adapted to be hung on ears 134 affixed to and projecting from the opposite side of the sleeve 40, and the lower end of the tube is provided with similar ears 136 upon which may be hung the distributor 138, which may be provided with hooks 140 for the purpose. Such hooks are of rectangular configuration complemental to the rectangular cross section of the ears 134 and 138 so that whether the distributor 138 is attached directly to the sleeve 40, or attached to the end of the tube 130, as shown, the distributor axis will be held substantially vertical or aligned with the tube 130.

The tube 130 is adapted to be braced with its lower end in the center of the silo, by a strut 150 and flexible cables 152 and 154. A fixture 156, adapted to be clamped as at 157 over the upper edge of the masonry silo, at the doorway 24, is provided with a boss or tongue 158 over which the tubular end of the strut 150 is telescoped, and laterally inclined side tongues 160 and 162 over which the ends of relatively rigid tubular members 164 and 166 are slid. The outboard ends of the tubular members 164 and 166 have the cables 152 and 154 affixed thereto, and such cables may be detachably connected with eyes 168 and 170 affixed towards the lower end of the tube 130. The other end of the strut 150 is provided with a hook 172 adapted to be inserted in an eye 174 also affixed to the tube 130.

The strut may be made of a number of telescopic sections, such as 180, 182 and 184, and removable pins 186, 188, each having flexible cords 190 affixed to or looped around the respective sections 182 and 184 to prevent loss. The pins may be disposed in transverse bores to block off the ends of the tubular sections 182 and 184 respectively, and thus form a socket for the ends of the sections 180 and 182, to maintain the telescopic sections of the strut in extended relation as shown in FIGURE 10. Upon removal of the pins 186 and 188 from their respective transverse apertures, the sections 180, 182 and 184 may be telescoped within one another, so that the strut is telescoped to a handy length for removal from the silo with the fixture 156, whenever there is no need therefor. It will be seen that by providing cables 152 and 154 of a proper length, and that by telescopically extending the strut, and sliding the rods 164 and 166 into place on the tongues 160 and 162, the tube 130 is held centered in the silo.

When the silo is filled to the level of the distributor 138 and its rotating chute 139, the distributor and tube 130 are swung over to the doorway 24, the distributor unhooked from the tube 130 and the tube unhooked from the nozzle 40. Thereafter, the distributor is hung directly from the ears 134 of nozzle 40. In order to facilitate placing the distributor upon the nozzle 40, the tube 130 is so constructed as to serve as a step ladder, the tube being provided with staggered foot rests 200, and a pair of brace rods, 202 and 204 pivoted to a collar 206 at the upper end of the tube. The lower ends of the rods 202 and 204 may be provided with disks 208 to prevent the ends from sinking into the surface level of silage, see S in FIGURE 2, and the tube 130 is of such diameter as to likewise be readily supported upon the surface level of silage in the silo. The pivots 210 and 212 of the rods 202 and 204, are such that when the rods 202 and 204 are swung angularly to the rear to provide the ladder, the lower ends of such rods are caused to space themselves so that the points 214 thereof, and the lower end 216 of the tube 130, in effect are on a base area of substantially equilateral triangular configuration. In such position the distributor can be carried up the ladder and hooked upon the nozzle ears 134. Thereafter the tube can be removed from the silo through the door, and hung outside as on the rail of the catwalk 73, adjacent the ladder 72. In this manner the filling of the silo into the dome, by even distribution can be effected, and when the level of silage reaches the distributor, the distributor can be removed, and the dome filled by direct discharge from the nozzle.

In practice the distributor may correspond to that shown in application Serial No. 322,121, herein referred to and the discharge ducts of the distributor may correspond to those shown in pending application No. 227,858, filed October 2, 1962, now Patent No. 3,158,407, granted November 24, 1964.

It will be seen, that by the apparatus described, effective and efficient filling of a silo to its maximum capacity may be effected. The duct 30, being an important element of the combination, is readily installed in any silo dome roof, after providing the necessary slot therefor, and will increase the storage capacity thereof.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In combination, a circular silo having a circular silo wall and a dome roof, a slot of substantially uniform width in said roof extending from its lower edge to a point beyond the top center thereof, a channel sectioned duct having spaced side walls joined by a curved deflecting wall along one edge, the other edges of said walls corresponding essentially to the configuration of the edges of the slot and being mounted adjacent thereto with the deflecting wall and side walls disposed substantially completely outside of and above the dome roof, said side walls and deflecting member at the lower end defining a substantially square channel and terminating in a sleeve disposed on a vertical axis and of square cross section at its upper end, and a flared circular cross section at its lower end, and said side walls and deflecting member having a depending discharge nozzle at the upper end disposed on a vertical axis, the upper end of which is substantially square in cross section and of a width corresponding to the spacing between the side walls, and the lower end of which comprises a nozzle and is circular and of reduced cross section, a cylindrical tube vertically disposed in said silo substantially on the vertical axis of the silo having its upper end disposed about the circular lower end of said nozzle means for detachably supporting the upper end of said tube upon said nozzle, and a power actuated silage distributor at the lower end of said tube, and means for detachably supporting said distributor from said tube.

2. The combination of claim 1, wherein the other edges of said walls are provided with laterally extending troughs disposed inside of the dome roof and below the spaced side edges of said slot.

3. The combination of claim 1, wherein the means for detachably supporting said tube to the nozzle is interchangeable with the means for detachably supporting said distributor on said tube whereby said distributor may be detachably supported directly upon said nozzle.

4. The combination of claim 1, including brace means affixed to the silo wall and connected to the lower end of said tube to hold the same in the center of the silo.

5. The combination of claim 1, wherein foot rests are affixed to said tube at fixed intervals along a front side thereof, and a pair of legs substantially the length of the tube are pivoted upon the opposite sides of the upper end of said tube, whereby the tube may serve as a step ladder for use within the silo.

References Cited by the Examiner
UNITED STATES PATENTS

| | | | |
|---|---|---|---|
| 2,523,381 | 9/1950 | Lindemeier | 214—17.6 |
| 3,064,833 | 11/1962 | Von Ruden | 214—17.64 |

SAMUEL F. COLEMAN, *Primary Examiner.*